United States Patent Office 2,982,694
Patented May 2, 1961

2,982,694
STEROID PRODUCTION WITH STREPTOMYCES AND CLADOSPORIUM

Thomas H. Stoudt, Westfield, Matthew A. Kozlowski, South River, and William J. McAleer, Roselle, N.J., assignors to Merck & Co., Inc., Rahway, N.J., a corporation of New Jersey No Drawing. Original application Jan. 9, 1958, Ser. No. 707,860. Divided and this application Sept. 22, 1958, Ser. No. 762,273

3 Claims. (Cl. 195—51)

The application is a division of our copending application Serial No. 707,860, filed January 9, 1958.

This invention is concerned generally with novel steroid compounds and processes of preparing the same. More particularly, it relates to 9α-fluoro-1ε,11β,17α,21-tetrahydroxy-4-pregnene-3,20-dione, and 1ε-hydroxyprogesterone and to the processes for preparing these compounds.

The novel 9α-fluoro-1ε,11β,17α,21-tetrahydroxy-4-pregnene-3,20-dione and 1ε-hydroxyprogesterone prepared in accordance with this invention possess anti-inflammatory activity and are especially effective for the treatment of arthritis and related diseases.

In preparing the novel 9α-fluoro-1ε,11β,17α,21-tetrahydroxy-4-pregnene-3,20-dione, we utilize as the starting material the known compound 9α-fluoro-11β,17α,21-trihydroxy-4-pregnene-3,20-dione having the following structural formula—

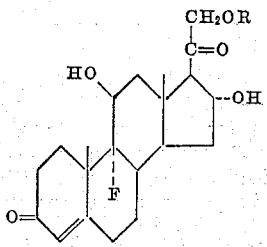

wherein R is acyl.

In accordance with the present invention, the starting material, namely, 9α-fluoro-11β,17α,21-trihydroxy-4-pregnene-3,20-dione 21-acylate is subjected to the action of an oxidizing enzyme produced by an oxygenating strain of Streptomyces olivochromogenus under aerobic conditions to form 9α-fluoro-1ε,11β,17α,21-tetrahydroxy-4-pregnene-3,20-dione, a compound having the structural formula—

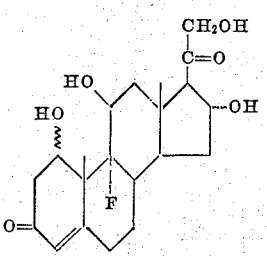

In carrying out the process of the present invention, strains of Streptomyces olivochromogenus, capable of oxygenation of 9α-fluoro-11β,17α,21-trihydroxy-4-pregnene-3,20-dione can be obtained from known culture collections, for example, one such culture of Streptomyces olivochromogenus can be obtained from American Type Culture Collection, Washington, D.C., No. ATCC 13025. The microorganism is grown under aerobic conditions in intimate contact with the 9α-fluoro-11β,17α,21-trihydroxy-4-pregnene-3,20-dione to be oxygenated. The fermentation or growing of the microorganism can be continued until the desired oxygenation has occurred.

In preparing the novel 1ε-hydroxyprogesterone, we utilize as the starting material progesterone which may be represented by the following structural formula—

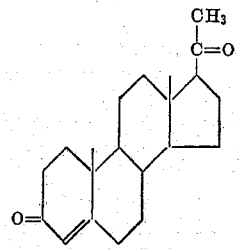

The progesterone is subjected to the action of an oxidizing enzyme produced by an oxygenating strain of Cladosporium sp. under aerobic conditions to form 1ε-hydroxyprogesterone, a compound having the structural formula—

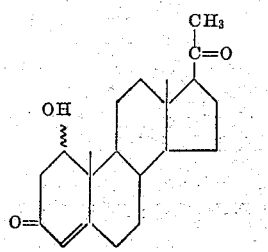

In carrying out this process strains of Cladosporium sp. capable of oxygenation of progesterone can be obtained from known culture collections; for example, one such culture of Cladosporium sp. can be obtained from American Type Culture Collection, Washington, D.C., No. ATCC 13026. The microorganism is grown under aerobic conditions in intimate contact with the progesterone to be oxygenated.

The following examples illustrate methods of carrying out the process of the present invention:

EXAMPLE 1

Formation of 9α-fluoro-1ε,11β,17α,21-tetrahydroxy-4-pregnene-3,20-dione 80.0 grams of 9α-fluoro-11β,17α,21-trihydroxy-4-pregnene-3,20-dione 21-acetate was incubated for 72 hours with Streptomyces olivochromogenus, American Culture Collection No. ATTCC 13025, which had been pregrown for 48 hours in a lactalbumin digest, dextrose, corn steep liquor medium. The culture filtrate was extracted with ethyl acetate and the extract concentrated in vacuo at 45° C. to a viscous oil. The residue was triturated with petroleum ether (30–60° C.) to remove excess oils, dissolved in benzene; ethyl acetate (9:1) and charged through a column of diatomaceous earth saturated with water:methanol (1:1). Development of the column with benzene:ethyl acetate (9:1) brought the 9α-fluoro-11β,17α,21-trihydroxy-4-pregnene-3,20-dione steroidal substrate off in the first fractions, the 9α-fluoro-1ε,11β,17α,21-tetrahydroxy-4-pregnene-3,20-dione in the middle fractions and 9α-fluoro-11β,17α,21-20-tetrahydroxy-4-pregnene-3-one in the final fractions. Subsequent development with benzene:ethyl acetate (8:2) eluted a more polar product tentatively identified as 9α-fluoro-6β,11β,17α,21-tetrahydroxy-4-pregnene-3,20-dione.

Combination of the middle fractions yielded 5.9 g. of crude 1ε,11β,17α,21-tetrahydroxy-4-pregnene-3,20-dione. Recrystallization first from acetone and then from methanol yielded 1.9 g. of white crystalline material in the first crop, M.P. 247–250° C., $\lambda_{max.}^{MeOH}$ 237 mμ, E, percent, 425, $\lambda_{max.}^{Nujol}$ 2 9μ (OH), 5.89μ (20 carbonyl), 6.02μ (α,β-unsaturated ketone)

Calculated for $C_{21}H_{29}O_6F$: C, 63.63; H, 7.32. Found: C, 63.9; H, 7.6.

Homogeneity was indicated by paper-strip chromatography.

The isolated alcohol 9α-fluoro-1ε,11β,17α,21-tetrahydroxy-4-pregnene-3,20-dione in pyridine at room temperature for 16 hours and yielded 9α-fluoro-1ε,11β,17α,21-tetrahydroxy-4-pregnene-3,20-dione 1ε,21-diacetate. M.P. 218–221° C., $\lambda_{max.}^{MeOH}$ 238 mμ, E, percent, 343

Calculated for $C_{25}H_{33}O_8F$: C, 62.50; H, 6.87. Found: C, 62.63; H, 7.14.

The identity of 9α-fluoro-1ε,11β,17α,21-tetrahydroxy-4-pregnene-3,20-dione was established by converting the 9α-fluoro-1ε,11β,17α,21-tetrahydroxy-4-pregnene-3,20-dione 1ε,21-diacetate to 1ε-dehydro-9α-fluoro-11β,17α,21-trihydroxy-4-pregnene-3,20-dione 21-acetate. This was effected by refluxing a portion of the diacetate in glacial acetic acid for 1 hour. Paper-strip chromatographic examination of the reaction mixture showed it to contain principally 1ε-dehydro-9α-fluoro-11β,17α,21-trihydroxy-4-pregnene-3,20-dione 21-acetate contaminated with traces of starting material. The solution was evaporated to dryness in vacuo, the residue chromatographed over acid-washed alumina and the eluted 1ε-dehydro-9α-fluoro-11β,17α,21-trihydroxy-4-pregnene-3,20-dione 21-acetate, freed of starting material, was crystallized twice from acetone-Skellysolve B, M.P. 225–236° C., $\lambda_{max.}^{MeOH}$ 238 mμ, E, percent, 358

Calculated for $C_{23}H_{30}O_6F$: C, 65.64; H, 6.90. Found: C, 65.92; H, 6.97.

Mixed melting point with an authentic sample gave no depression and the infra-red spectra were identical. The original alcohol 9α-fluoro-1ε,11β,17α,21-tetrahydroxy-4-pregnene-3,20-dione can be similarly converted to 1ε-dehydro-9α-fluoro-11β,17α,21-trihydroxy-4-pregnene-3,20-dione. From this evidence it is clear that the fermentation product is 9α-fluoro-1ε,11β,17α,21-tetrahydroxy-4-pregnene-3,20-dione.

EXAMPLE 2

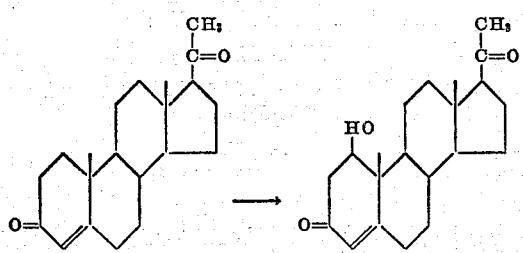

Ten 2-liter shake flasks of culture identified as Cladosporium sp. American Culture Collection No. ATCC 13026 was incubated with 10 x 280 mg. of progesterone for 72 hours. The broth was extracted with 3 x 2 liters of ethyl acetate. The solvent was evaporated, leaving a brown-black oil. The oil was dissolved in 20 ml. of benzene and then partitioned on a 100 gram super-cel column using formamide as the stationary phase and benzene as the mobile phase. The products eluted from the column were unreacted progesterone, 7-hydroxyprogesterone followed by 1ε-hydroxyprogesterone. The benzene fractions containing the 1ε-hydroxyprogesterone were washed with 100 ml. of water to remove formamide. On evaporation of the solvent, 1ε-hydroxyprogesterone was isolated.

The steroid was characterized by conversion to the known 1ε-dehydroprogesterone.

It should be understood that various changes may be made in the present process as herein described without affecting the results attained. Thus, various modifications of conditions as to time, temperature, alkalinity, acidity, etc., and various changes in procedure differing from those herein as illustrative of the preferred embodiments of this invention may be made without departing from the scope thereof. Accordingly, the scope of this invention is to be determined in accordance with the prior art and the appended claims.

We claim:

1. The process for the production of 1ε-hydroxy-4-pregnene-3,20-dione compounds which comprises subjecting the corresponding 4-pregnene-3,20-dione compound to the activity of an oxidizing enzyme produced by an oxygenating strain of a microorganism selected from the group consisting of Streptomyces olivochromogenus and Cladosporium sp. under aerobic conditions.

2. The process for the production of 9α-fluoro-1ε,11β,17α,21-tetrahydroxy-4-pregnene-3,20-dione which comprises subjecting 9α-fluoro-11β,17α,21-trihydroxy-4-pregnene-3,20-dione to the action of an oxidizing enzyme produced by an oxygenating strain of Streptomyces olivochromogenus under aerobic conditions.

3. The process for the production of 1ε-hydroxyprogesterone which comprises subjecting progesterone to the action of an oxidizing enzyme produced by an oxygenating strain of Cladosporium sp. under aerobic conditions.

References Cited in the file of this patent

UNITED STATES PATENTS

| | | |
|---|---|---|
| 2,649,401 | Haines et al. | Aug. 18, 1953 |
| 2,753,290 | Fried et al. | July 3, 1956 |
| 2,840,579 | Perlman et al. | June 24, 1958 |
| 2,855,343 | Fried et al. | Oct. 7, 1958 |

OTHER REFERENCES

Ann. New York Acad. Sciences, vol. 60, Art. 1, pp. 27 and 150.